March 28, 1967  C. CRISTOFV ET AL  3,311,108
MEANS FOR ARTIFICIALLY PRODUCING AND CONTROLLING ELECTRIC POWER
FIELD STRENGTHS AND FREELY SUSPENDED IONS IN THE ATMOSPHERE
Filed Feb. 26, 1962  2 Sheets-Sheet 1

INVENTORS
CRISTJO CRISTOFV
GEORGE N. CRISTOFV
BY
*Alfred W. Petchaft*
ATTORNEY

INVENTOR.
CRISTJO CRISTOFV
GEORGE N. CRISTOFV

United States Patent Office 3,311,108
Patented Mar. 28, 1967

3,311,108
MEANS FOR ARTIFICIALLY PRODUCING AND CONTROLLING ELECTRIC POWER FIELD STRENGTHS AND FREELY SUSPENDED IONS IN THE ATMOSPHERE
Cristjo Cristofv and George N. Cristofv, both of 2649 Lawndale Ave., Evanston, Ill. 62242
Filed Feb. 26, 1962, Ser. No. 175,419
2 Claims. (Cl. 128—190)

This invention relates in general to certain new and useful improvements in a device and method for producing and controlling electric power field strengths and freely suspended ions in the atmosphere, and, more particularly, to a device and method for producing and controlling field strengths and freely suspended ions in enclosed objects such as motor vehicles and buildings of metallic structure.

It is well known that in nautre a positive electric power field permanently encircles the entire earth. This positive electric power field has an average field strength of approximately a few hundred volts per meter in free spaces at sea level elevations, and is also know to increase as the elevation of the earth increases and often attains a strength of up to several thousand volts per meter in mountainous regions. Moreover, it has been observed that the field strength of this electric power field remains constant during fair weather and normal atmospheric conditions, but will fluctuate as the atmospheric conditions fluctuate.

Recently there has been some research and development concerning the production of artificial electric power fields. It has thus been recently determined that all living matter on the earth's surface is dependent upon, and affected by, the existing natural electropower field environment in any particular area. More particularly, it has been found that buildings constructed of steel and concrete, airplanes, and vehicles simulate almost perfect electrically shielded environment or so-called "Faraday cage." A person within this completely or partially electrically shielded environment tends to become mentally fatigued and drowsy over a period of time. Recent tests have shown that the creation of an artificial electropower field within such shielded environment will tend to eliminate these undesirable conditions.

In connection with the present invention, it has been found that the natural electric power field and freely suspended negative ions in the atmosphere have a definite biophysiological effect on the condition of human beings. The earth's atmosphere contains a certain quantity of freely suspended negative ions which will vary according to the geological structure of the particular area and the strength of the existing natural electric power field of that area. However, the natural electric power field disappears in enclosures which have the physical qualities of a Faraday cage, therefore the favorable physiological effect of the combined physical action of the electropower field and ions also disappears. It has thus been found that by artificially producing an electric power field and a quantity of freely suspended negative ions, a favorable condition is attained wherein it is possible to perform certain selective biochemical changes in an individual subjected to the electric power field. These biochemical changes will improve psychomotor performance and response by successfully combating premature fatigue, drowsiness, sleepiness, and unpleasant conditions which often arise in human beings within any enclosure which has completely or partially the effect of a Faraday cage.

It is, therefore, the primary object of the present invention to provide a means and method for creating and controlling an artificial electric power field and controlled amount of freely suspended negative ions within a particular enclosure which will effectively simulate the conditions produced by the natural electric power field of the earth.

It is another object of the present invention to provide a method for successfully eliminating premature fatigue, drowsiness, sleepiness, and similar undesirable conditions that are found to exist among persons residing in enclosures which simulate the so-called "Faraday cage."

It is an additional object of the present invention to provide a means for creating an artificial electric field with freely suspended negative ions which will have a desired biophysiological effect on human beings.

It is also an object of the present invention to provide a device of the type stated that is relatively inexpensive, and simple in operation.

With the above and other objects in view, our invention resides in the novel features of form, construction, arrangement, and combination of parts presently described and pointed out in the claims.

Figure 1:
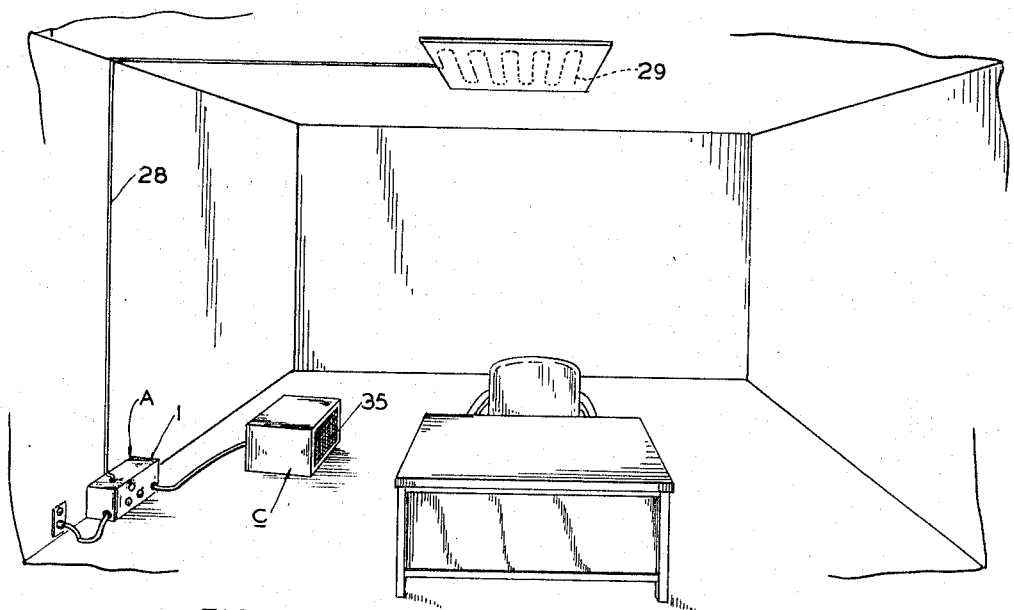
FIG. 1 is a fragmentary perspective view of a room equipped with the electropower field generator for producing and controlling an electropower field and freely suspended ions, which is constructed in accordance with and embodying the present invention.

Referring now in more detail and by reference characters to the drawings, which illustrate practical embodiments of the present invention, A designates an electropower field generator comprising an outer housing or cabinet 1. Mounted within the housing 1 is a conventional power transformer 2 having a primary winding 3 and a secondary winding 4, and which is connected to a suitable source of 110 volt or 220 volt alternating current $f$ by means of current-carrying conductors 5, 6. Interposed in the current-carrying conductor 6 is a conventional off-on toggle switch 7. Connected in parallel to the primary winding 3 is a pilot light 8 which is preferably a neon bulb.

Connected to each terminal of the secondary winding 4 are current-carrying conductors 9, 10. Bridging the two conductors 9, 10, are a series of four diodes 11, 12, 13, 14, which are arranged to cause a current flow through the conductor 9 and back into the secondary winding 4 through the conductor 10. Interposed in the conductor 10 and connected across one terminal of the diode 14 and secondary winding 4 are a pair of condensers 15, 16. Also shunting two of the diodes 12, 13, are condensers 17, 17'. Connected in parallel with the secondary winding 4 are a series of four commonly connected condensers 18, 19, 20, 21, which also bridge the current-carrying conductors 9, 10. A connecting wire $w$ interconnects the condensers 19, 20, and the diodes 12, 13. A commonly connected pilot light 22 and fixed resistor 22a are connected across the condensers 18 and 21.

The current-carrying conductors 9, 10, terminate at a condenser 23 and connected to each terminal of the condenser 23 are variable resistors 24, 24a, which are mechanically interconnected and operable by a single dial $d$. Connected to each of the variable resistors 24, 24a, are fixed resistors 25, 25a, which are connected to fixed resistors 26, 26a, the resistors 26, 26a each being commonly connected and grounded at a suitable ground 27. The transformer 2 should be designed to impress two thousand volts of direct current across the condenser 23 at an input voltage of 110 volts or 220 volts of alternating current. From the above circuitry, it can be seen that a negative voltage will be delivered to the variable resistor 24 and fixed resistor 25, and a positive voltage will be delivered to the variable resistor 24a and fixed resistor 25a.

Electrically connected to the variable resistor 24a through the fixed resistor 25a is an anode electrode lead 28 which is insulated from, and extends outwardly of, the housing 1 and which is connected to a suitably placed anode electrode 29. The anode electrode 29 is preferably mounted on, or immediately beneath, the ceiling of an enclosure in which the generator A is to be used. It is, of course, obvious that the anode electrode 29 could suitably be mounted on the ceiling in an automobile, truck, airplane, submarine, or other similar vehicle. The housing 1 is then installed in any suitable location for easy access thereto. As shown in FIG. 1, the anode electrode 29 consists of a length of copper wire formed in a series of adjacent convolutions. It is, of course, obvious that a flat metal plate could also serve as an effective anode electrode. Either form of the anode electrode 29 should, however, be mounted within some suitable insulating material to prevent a short circuit with the ground of the enclosure. A conventional toggle switch 30 is interposed in the anode electrode lead 28.

Connected to the variable resistor 24 by means of a negative lead line 31 is an anion generator 32, the lead line 31 being insulated from, and extending outwardly of, the housing 1. The anion generator 32 should be preferably mounted in some unobstrusive location immediately above the floor of the enclosure and at least a foot or more away from any wall of the enclosure in order to insure adequate air flow around the generator 32. The anion generator 32 generally comprises an outer metallic housing 33 having a suitably positioned aperture 34. Mounted within the aperture 34 is a metallic cup 34a containing a small amount of radioactive ionizing material such as radium sulfide or tritium. Such radioactive materials are most suitable as they possess a half-life of ten years or more and will emit alpha, beta and gamma particles in sufficient quantities. The ions, which are produced by the particles of the radioactive material, are then blown through a negatively charged filter screen or grid 35 by means of a conventional electric fan 36. The grid 35 is also electrically connected to the negative lead line 31. A toggle switch 37 is interposed in the lead line 31 between the fixed resistor 25 and the anion generator 32. The fan 36 is mounted in close proximity to, and directly behind, the anion generator 32 and is electrically connected across the current-carrying conductors 5, 6, by means of conductors 38, 39. A conventional off-on toggle switch 40 is mounted within the conductor 38 for controlling operation of the fan 36. By reference to FIG. 1, it can be seen that the generator 32 and fan 36 can be mounted within a suitable container c having a louvered back l. The negatively charged grid 35 would form the front end of the container c.

Figure 2:
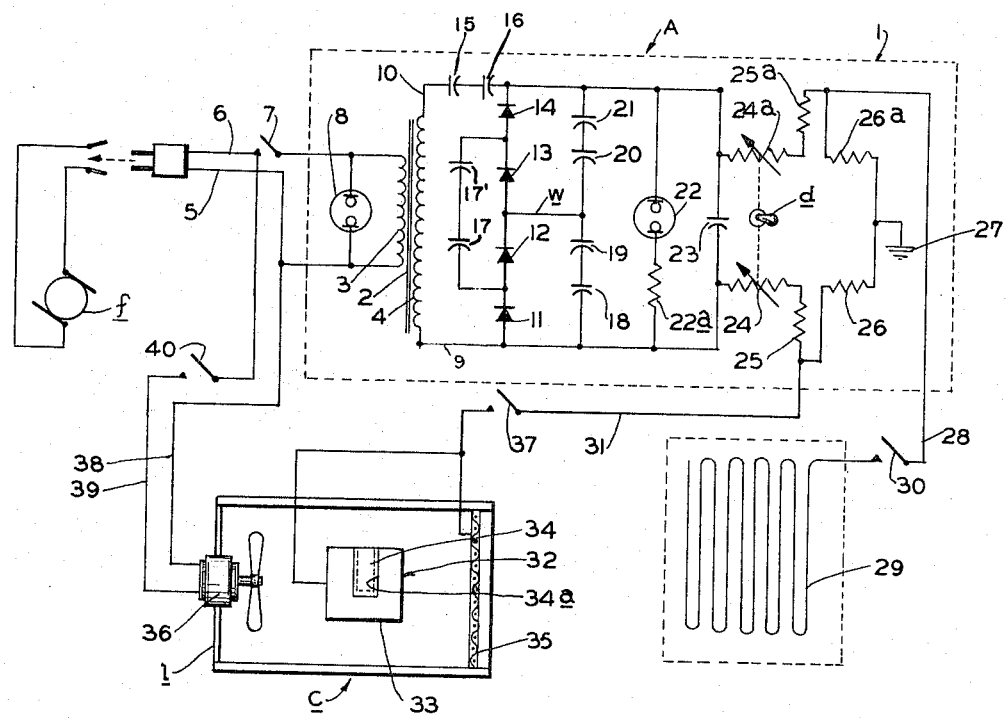
FIG. 2 is a schematic wiring diagram of the electropower field generator.

In use, the main off-on switch 7 is closed, causing current to flow through the primary winding 3 of the transformer 2. The current passing through the primary winding 3 will induce a flux and voltage in the secondary winding 4, thereby causing a current to flow in the current-carrying conductors 9, 10, which are connected to the secondary winding 4. As the switch 7 is closed, the pilot light 8 will also light up. It can be seen by reference to FIG. 2 that the diodes 11, 12, 13, 14, are biased to allow current flow from the conductor 9 to the conductor 10. As a charge builds up across the condensers 18, 19, 20, 21, the pilot light 22 will thereupon light up. At this point, the voltage impressed across the condenser 23 should approximate 2000 volts of direct current. The amount of positive current delivered to the anode electrode 29 and negative current to the anion generator 32, of course, can be proportionally regulated by means of the single dial d which mechanically connects the variable resistors 24, 24a. The toggle switch 40 is then closed energizing the electric fan 36. The toggle switches 30 and 37 are thereupon closed energizing the anode electrode 29 and anion generator 32, respectively.

The high voltage delivered to the resistor 24 is then carried to the anion generator 32 through the negative lead line 31, causing the housing 33 and filter screen 35 to become negatively charged. The continuous stream of air provided by the fan 36, which is located rearwardly of the generator 32, will cause the emitted anions from the anion generator 32 to flow through the grid 35 and thereupon circulate into the atmosphere of the particular enclosure.

In this connection, it is to be noted that the alpha particles, which are positively charged, will be immediately attracted to the highly negatively charged metallic housing 33 and thereby neutralized. A portion of the alpha particles, however, which escape neutralization at the metallic housing 33 will be neutralized at the negatively charged grid 35. A small part of the alpha particles which may also escape neutralization at the grid 35 will be emitted from the generator 32 into the atmosphere of the particular enclosure, but, after traversing a distance of 5 to 6 centimeters, will dissipate most of their energy due to the brake effect of the air.

The rapidly moving beta particles, which are emitted from the generator 32 and which are negatively charged, will collide with the molecules of the air, thereby upsetting the balance of each of these neutral molecules and transform the mass of the majority of these molecules into negative ions or anions, and the remainder of the molecules into positive ions or cations. The negative ions, which are lighter than the positive ions, will flow upwardly within the particular enclosure because of the attracting force of the positive electric power field created by the positively charged anode electrode 29. Moreover, the upwardly directed flow of the anions will be increased by the repelling force of the negatively charged ground of the particular enclosure. The few positive ions which are produced in the enclosure will flow downwardly due to the attracting force of the negatively charged ground of the particular enclosure and by the repelling force of the positively charged anode electrode 29.

The radiated gamma particles having short wave lengths which are emitted from the generator 32 into the atmosphere of the particular enclosure will dissipate most of their energy after about 50 centimeters because of the brake effect of the air.

The alpha and gamma particles which are emitted from the generator 32 and escape neutralization at the grid 35 will produce a small quantity of ion-pairs consisting of anions and cations. Inasmuch as the anions and cations produced are not immediately recombined and thus neutralized, they will be separated by the attracting and repelling force of the existing electric power field in the particular enclosure. Thus, the cations will be attracted by the negatively charged ground and the anions will be attracted by the positively charged anode electrode 29. Since both the anions and cations are electrically charged particles, they will always begin their movement by attraction or repulsion within an enclosure having an electric power field. The anions and cations will move with a speed which depends upon the strength of the existing electric power field in the particular enclosure. Consequently, rooms having no electric power field will have no ion movement.

It is, of course, obvious that where the ions are not moving because of the lack of an electropower field, the tendency of the ions to recombine is very large. Where, however, the ions are separated and moving at considerable speed, because of an existing electropower field, the tendency to recombine is considerably reduced. Because of this forceful separation and movement of the anion and cations through the electropower field, it can be seen that their normally short lifetime is considerably lengthened.

As the speed of the ion movement is proportional to the electric field strength, the velocity of the anions and cations can be determined by the following relationship:

$$V = S \times M$$

where V represents the velocity of the ions in centimeters per second, S represents the electric field strength in volts per centimeter, and M represents the mobility factor where the mobility factor can be defined as the speed of the anion or cation movement in an electropower field of 1 volt per centimeter. It is well known that the mobility factor of the anions is expressed by the following relationship of dimensions:

$$M_{anion} = a \; \frac{\text{centimeters/second}}{\text{volts/centimeter}}$$

and the mobility factor of the cations can be expressed as $$M_{cation} = c \; \frac{\text{centimeters/second}}{\text{volts/centimeter}}$$

The mobility factor of the anions in the air has been found to be:

$$M_{anion} = 1.9 \; \frac{\text{centimeters/second}}{\text{volts/centimeter}}$$

and that of the cations to be:

$$M_{cation} = 1.3 \; \frac{\text{centimeters/second}}{\text{volts/centimeter}}$$

Therefore, if the electric power field generator A were utilized in a room having an electric field strength of 1000 volts per meter, the anions would have an upwardly directed velocity of 19 centimeters per second and the cations would have a downwardly directed velocity of 13 centimeters per second, according to the above equations.

From the above, it should be obvious that if the electric field strength of a certain enclosure is zero, then the velocity of the ions in the air of this enclosure must also be zero. Therefore, in a room of zero field strength, the ions would move only as the air molecules move, such as by air draft or thermal fluctuation according to the "Brownian Movement." As the anions and cations would not be attracted and repelled by the force of an electric power field and thus would not be moving rapidly, forcible separation of the two ions of different polarity would not be present. The possibilities of quick and easy recombination is, therefore, actually increased, and, consequently, the lifetime of the ions is shortened.

The mathematical relation between the number of ions produced per second and the lifetime of the ions in the particular enclosure can be represented by the following equation:

$$n = N \cdot t$$

where $n$ represents the amount of the existing ions per cubic centimeter in the particular enclosure, N represents the amount of ions produced per second in one cubic centimeter, and $t$ represents the lifetime of the ions in units of seconds.

In certain tests performed in a room with a zero electric field, it was determined that from an ion generator, which output was approximately $10^8$ ion-pairs per second, the actual number of ion pairs existing in that room at a distance of two meters from the ion generator was only 2 pairs per cubic centimeter, and, therefore, the average life span of the ions was determined to be .02 millisecond. However, when the electropower field generator A was turned on with the field strength increased to 1000 volts per meter, the average anion density increased to more than 10,000 anions per cubic centimeter at an average distance of two meters from the generator. Thus, the average lifetime of the anions was increased to more than 100 milliseconds or by a factor of 5000. It has also been determined that at a produced electric field strength of 1000 volts per meter and an emission of $10^8$ ion-pairs per second, an electrical current density of several micro-micro amperes per square centimeter resulted on each person within the particular enclosure.

It should be obvious that the simultaneous control of the electric field strength of the anode electrode 29 and the anion generator 32 by means of the control dial $d$ enables equivalent control of the two constituent parts. Thus, the life of the anions produced by the anion generator 32 and the concentration thereof is held proportionally constant with respect to the electric field strength. The fan 36 is mounted in contiguous relation to the anion generator 32 so that the fan 36 sets the air in motion and effects an even concentration of anions around the enclosure.

Figure 3:
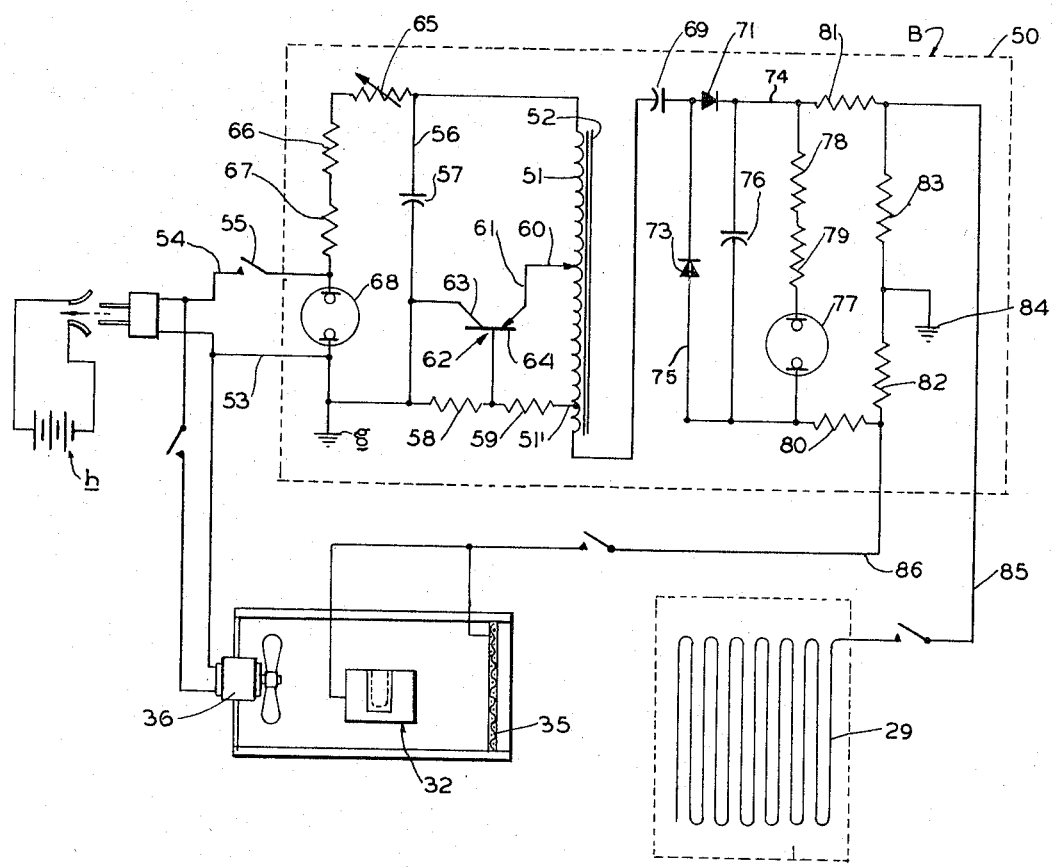
FIG. 3 is a schematic wiring diagram of a modified form of electropower field generator.

It is possible to produce a modified form of an electropower field generator B substantially as shown in FIG. 3. The electropower field generator B is designed primarily for use with direct current and, more particularly, for use with 6 or 12 or 24 volt batteries. The field generator B comprises an outer housing or cabinet 50 in which is mounted an induction coil 51 having a metallic core 52. Connected to one terminal of the induction coil 51 and to a tap 51' near the other terminal of the induction coil 51 are current-carrying conductors 53, 54, which extend outwardly of the housing 50 and are connected to some suitable source of direct current $h$. A conventional off-on toggle switch 55 is mounted in the current-carrying conductor 54, externally of the housing 50 for energizing and de-energizing the electropower field generator B. Bridging the conductors 53, 54, is a condenser line 56 and a condenser 57 which, in effect, shunts the induction coil 51. Two fixed resistors 58, 59, are interposed in the current-carrying conductor 53 between the tap 51' and the condenser line 56. The induction coil 51 is provided with a center-tap 60 which is connected to the emitter 61 of a PNP transistor 62, the collector 63 of the transistor 62 being connected to the negative terminal of the condenser 57 and the base 64 of the transistor being connected to the common connection of the fixed resistors 58, 59. A variable resistor 65 and two fixed resistors 66, 67, are interposed in the current-carrying conductor 54 and connected in series with the condenser 57. Finally, a pilot light 68 is connected across each of the conductors 53, 54, in parallel with the condenser 57. The conductor 53 is also grounded at a suitable ground $g$, all as can best be seen in FIG. 3.

Connected to the lower terminal of the induction coil 51, common to the fixed resistors 58, 59, is a condenser 69 which is, in turn, connected to a diode 71 and diode 73, the diodes 71, 73, being interposed in conductors 74, 75, respectively. By reference to FIG. 3, it can be seen that the diodes 71, 73, are arranged with respective polarity so that current will flow from the conductor 75 through the conductor 74. Bridging the diodes 71 and 73 is a condenser 76. The induction coil 51 and condenser 76 should be designed to allow a delivery voltage of 2000 volts to the condenser 76. Bridging each of the conductors 74, 75, and connected to each pole of the condenser 76 is a neon pilot light 77 and two fixed resistors 78, 79, thereby rendering the resistors 78, 79, and the pilot light 77 in parallel relationship with the condenser 76 and diodes 71, 73. Connected to one pole of the pilot light 77 and one pole of the fixed resistor 78 are a pair of fixed resistors 80, 81, which are interposed in the conductors 75, 74 respectively, and connected to the other pole of each of the resistors 80, 81, are a pair of fixed resistors 82, 83, which are, in turn, connected to each other and grounded by a common ground 84. From the above-outlined circuitry, it can be seen that a positive voltage will be delivered to the resistor 81 and a negative voltage will be delivered to the resistor 80.

Connected to the common terminals of the fixed resistors 81, 83, is an anode electrode lead 85 which is similar in all respects to the previously described anode electrode lead 28. Connected to the common terminals of the fixed resistors 80, 82, is a negative lead line 86 similar in all respects to the previously described negative lead line 31. Suitably connected to the anode electrode lead 85 and the negative lead line 86 are the previously described anode electrode 29 and the anion generator 32, respectively.

The electropower field generator B is designed primarily for use with a low source of voltage such as a direct current battry. The current-carrying conductors 53, 54, are connected to the battery $h$, as shown schematically in FIG. 3. Thereupon, the main circuit switch 55 is closed, causing current to flow in the conductors 53, 54, and lighting up the pilot light 68. By reference to FIG. 3, it can be seen that the fixed resistors 58, 59, 66, 67, in connection with the variable resistor 65 and transistor 62 form an interrupter circuit which renders current intermittently to the induction coil 51. It is to be noted that either or both of the fixed resistors 66, 67, can be eliminated if the source of power is a 6 or 12 volt battery. However, both resistors are needed if the power source is a 24-volt battery. The rapid variations of magnetic flux thus produced in the induction coil 51, thereby induce a high voltage across the condensers 69 and 76. The induction coil 51 should be of such size so as to produce a voltage of 2000 volts across the condenser 76. It, of course, is obvious that the amount of voltage impressed across the condenser 76 can be regulated by the variable resistor 65. When a charge has been built up across the condenser 76, the pilot light 77 will thereupon light up. As the voltage delivered to the condenser increases, the pilot light 77 will get proportionally brighter. The current is thereupon delivered to the anode electrode 29 by means of the anode electrode line 85, and also to the anion generator 32 through the lead line 86 in the manner as previously described in connection with the electropower field generator A. The fan 36 is connected across the current-carrying conductors 53, 54, also as previously described. When energized, the fan 36 effects an even concentration of anions in the air, from the anion generator 32, and the anode electrode 29 will create the positive electric field, as in the manner previously described.

The results obtained with the electropower field generator B have been found to be substantially equivalent to the results obtained with the electropower field generator A. Moreover, it should be obvious that the various switches and pilot lights in connection with each of the generators A and B can be suitably mounted in some type of control panel. It is obvious that the respective electropower field generators A and B can be suitably combined in a single housing and can accordingly be optionally operated off of alternating or direct current.

It should be understood that changes and modifications in the form, construction, arrangement, and combination of the several parts of the means and methods for artificially producing and controlling electric power field strengths and freely suspended ions in the atmosphere may be made and substituted for those herein shown and described without departing from the nature and principle of our invention.

Having thus described our invention, what we claim and desire to secure by Letters Patent is:

1. Means for improving psychomotor performance and performing selective biochemical changes in human beings located within an enclosure; said means comprising an enclosure, an anode electrode located on the ceiling of the enclosure, a metal capsule located close to the floor of the enclosure, a charge of radioactive material in said caspule, means associated with said capsule for emitting radioactive particles from said capsule, a transformer having a primary and a secondary, said primary being adapted to be connected to a source of alternating current, a series of at least four diodes connected across the terminals of the secondary, a pair of first condensers interposed between one terminal of the secondary and one of said diodes, a series of second condensers shunting at least two diodes in the middle of said series of diodes, a series of third condensers connected in parallel with said series of diodes, a fourth condenser connected across the terminals of the series of third condensers, variable resistor means connected across the poles of said fourth condenser, first conductor means connecting said variable resistor means to said anode electrode, and second conductor means connecting said variable resistor means to said capsule, said first conductor means being positively biased with respect to said second conductor means.

2. Means for improving psychomotor performance and performing selective biochemical changes in human beings located within an enclosure; said means comprising an enclosure, a source of direct current, an anode electrode located on the ceiling of the enclosure, a metal capsule located close to the floor of the enclosure, a charge of radioactive material in said capsule, means associated with said capsule for emitting radioactive particles from said capsule, an induction coil having first and second terminals, a variable resistor interposed between said first terminal of said induction coil and said source of direct current, a first condenser connected to said source of direct current and said first terminal of said induction coil, a pair of first fixed resistors interposed between said second terminal of said induction coil and said source of direct current, a transistor having its base connected to the common connection of said pair of first fixed resistors, its collector connected to one terminal of said first condenser and its emitter connected to a center-tap on said induction coil, one terminal of said induction coil being connected to a second condenser, a pair of diodes connected to said second condenser, a third condenser shunted across said pair of diodes, second and third fixed resistor means connected to each terminal of said third condenser, first conductor means for connecting said second fixed resistor means to said anode electrode, and second conductor means for connecting said third fixed resistor means to said capsule, said first conductor means being positively biased with respect to said second conductor means.

References Cited by the Examiner

UNITED STATES PATENTS

| 587,237 | 7/1897 | Sanche | 128—419 X |
|---|---|---|---|
| 2,132,539 | 11/1938 | McRae | 128—172.1 |
| 2,190,712 | 2/1940 | Hansen | 128—422 X |
| 2,415,659 | 2/1947 | Steel | 128—190 |
| 2,589,613 | 3/1952 | Hicks | 128—419 X |
| 2,928,942 | 4/1960 | Hicks et al. | 250—44 |
| 2,939,006 | 5/1960 | Oswald | 250—44 |

FOREIGN PATENTS

| 1,063,293 | 8/1959 | Germany. |
|---|---|---|
| 314,143 | 7/1956 | Switzerland. |

OTHER REFERENCES

Winsor et al., "American Journal of Physical Medicine," vol. 37, No. 2, April 1958, pp. 83–89. (Copy in Group 260.) 250–44.

ROBERT E. MORGAN, *Acting Primary Examiner.*

RICHARD A. GAUDET, R. J. HOFFMAN, *Examiners.*

R. D. TEGTMEYER, W. E. KAMM,
*Assistant Examiners.*